Patented Jan. 17, 1928.

1,656,252

UNITED STATES PATENT OFFICE.

RALF B. TRUSLER, OF DORMONT, PITTSBURGH, PENNSYLVANIA, ASSIGNOR TO THE ROESSLER & HASSLACHER CHEMICAL COMPANY, OF NEW YORK, N. Y., A CORPORATION OF NEW YORK.

METHOD OF MANUFACTURE OF ACYL AMINES.

No Drawing.   Application filed December 27, 1926. Serial No. 157,419.

This invention relates to the preparation of acyl derivatives of primary and secondary amines.

In general, acyl derivatives of primary and secondary amines are made by causing an amine to react with one of the following compounds:—

(1) An organic acid in the presence of a dehydrating agent.

(2) An anhydride of an organic acid.

(3) A salt of an organic acid in the presence of a mineral acid.

(4) An acyl chloride of an organic acid.

I have discovered a new method for making acyl amines from primary and secondary amines, wherein many of the disadvantages common to the ordinary methods are done away with, and whereby an easily controlled reaction is obtained. I have found that when certain primary or secondary amines are caused to react with an amide acid sulfate that a combination between the two compounds results in the formation of acyl amines and simultaneously of ammonium acid sulfate as a by product.

This reaction is illustrated by the equation:

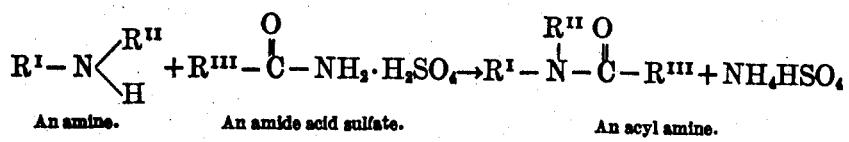

An amine.   An amide acid sulfate.   An acyl amine.

Wherein $R^I$ $R^{II}$ and $R^{III}$ represent alkyl, aryl or cyclic groups or radicals and where $R^{II}$ and $R^{III}$ may also represent hydrogen. I have found that the amine involved in this reaction must be less basic than the ammonia that occurs in the by-product of ammonium acid sulfate, otherwise this reaction will not take place. I have also found that hydroxy amides, where the hydroxyl group is attached to the same carbon atom as the amide group, as in lactamide acid sulfate, undergo other changes and do not satisfactorily react as do the other amide acid sulfates described in the examples given.

I have also found that this method of manufacture of acyl amines will in general allow the production of acyl amines which can be produced by the usual means of reacting an amine with an acid anhydride, but will not allow the production of acyl amines which cannot be obtained from the anhydride of an organic acid and an amide. For example, acetanilid can be obtained either by heating aniline with acetic anhydride or with acetamide acid sulfate, but the compound para acetyl amino phenol is not technically obtained by reacting p-amino-phenol with either acetic anhydride or with acetamide acid sulfate.

In order to illustrate my invention the following examples are given:

Example I.

*Formanilid.*—One gram mol of formamide acid sulfate weighing about 143.1 grams and one mol of aniline weighing about 93.1 grams were mixed and then heated with stirring up to 85° C. for about three hours. The reaction mixture gradually separated into two layers the upper one being mainly formanilid and the lower one being mainly ammonium acid sulfate. The reaction mixture was allowed to cool to about 65° and to it was added 100 grams of carbon tetrachloride which dissolved the formanilid. The carbon tetrachloride solution was then decanted and evaporated at reduced pressure, and there resulted an oily liquid that crystallized on standing. The crystalline compound was separated from the residual oily liquids by centrifuging. The purified substance was found to have a melting point of 47 to 48° C.

Upon analysis the compound was found to contain:—nitrogen, 11.56%; hydrogen, 5.57%; carbon, 69.35%; oxygen, 13.52% by difference.

When 121.1 grams of the compound was hydrolyzed by a solution of sodium hydroxide, 93 grams of aniline was recovered, while the water contained one mol (63 grams) of sodium formate in solution. The hydrolysis so effected also establishes the identity of the compound.

The reaction between formamide acid sulfate and aniline, by which formanilid is produced, is illustrated by the equation:

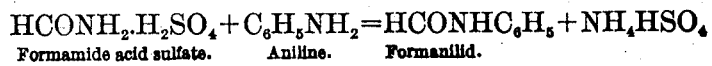
Formamide acid sulfate.  Aniline.  Formanilid.

Example II.

*Acet-toluid.*—One mol of acetamide acid sulfate weighing about 157.1 grams and one mol of p-toluidine weighing about 107.1 grams, were mixed in the presence of carbon tetrachloride and then heated to about 75° for three hours. The reaction mixture now consisted of a lower layer of ammonium acid sulfate and an upper layer of carbon tetrachloride in which the organic product of the reaction was dissolved. The carbon tetrachloride solution was separated, distilled from a water bath and finally under vacuum. The residue, which may be either solid or liquid depending upon purity, consisted essentially of acet-p-toluide. The pure compound was obtained by recrystallization from alcohol. Analyses showed that 149 grams of the compound contained 107 grams of p-toluidine and 43 grams of the acetyl radical obtained as 60 grams acetic acid. The melting point of the acet-p-toluide was found to be 109.0 to 109.3°.

Example III.

*Benzanilid.*—One-fourth gram mol (about 54.8 grams) of benzamide acid sulfate was crushed and coarsely ground and stirred into one-fourth gram mol (about 23.3 grams) of aniline. The mixture was then gradually heated so that it attained 100° in about five hours, 115° in about three hours more, and finally 117–118° in about three hours of further heating. The reaction mixture was held at 117 to 118° for about three hours. This heating caused a reaction to take place and produced a partially plastic mass which solidified upon cooling. The product was thoroughly cooled, then pulverized and stirred into 200 c. c. of cold water to leach out the ammonium acid sulfate byproduct. After standing four hours it was filtered off and stirred into 100 c. c. of water containing a little ammonia, then again filtered. The filter cake, when dry, consisted of forty-six grams of benzanilid of good quality. The melting point of the crude material was 156–157°, and after being crystallized from alcohol it melted at 159.5 to 160.5° C. The yield was 93.5% of theory.

Example IV.

*Meta-di formyl phenylene diamine.*—One hundred fifty grams of formamide acid sulfate contained in a one liter flask was covered with 250 c. c. of carbon tetrachloride and to it was added 54 grams of metal phenylene diamine. The flask was provided with a reflux condenser and then heated about two hours at 75–76°. The carbon tetrachloride was then distilled off by placing the flask in a hot water bath. The flask was then cooled and to it was added just enough ammoniacal alcohol to convert the byproduct of ammonium acid sulfate into $(NH_4)_2SO_4$. The product was washed with alcohol to remove unused m-phenylene diamine and then with water to remove the sulfate salts. The product obtained by this reaction was practically insoluble in water and alcohol. It was pinkish white in color and melted with decomposition about 300°. The character of this compound agrees with the description of meta di formyl phenylene diamine as given in the literature. Analysis showed that this compound consisted of carbon, 59.00%; nitrogen, 8.43% to 8.4%; hydrogen, 4.84% to 4.7%; which agrees with meta di formyl phenylene diamine in composition.

I claim:

1. Method of manufacture of acyl amines from those amines which contain at least one hydrogen atom linked directly to nitrogen, which are less basic than ammonia and which react with acid anhydrides to form acylamines comprising reacting these amines with amide acid sulphates.

2. Method of manufacture of acyl amines from those amines which are less basic than ammonia and which react with acid anhydrides to form acylamines comprising reacting these amines with amide acid sulphates.

3. Method of manufacture of acylamines from those amines which contain at least one hydrogen atom linked directly to nitrogen, which are less basic than ammonia and which react with acid anhydrides to form acylamines comprising reacting these amines with formamide acid sulphate.

4. Method of manufacture of acyl amines from those amines which are less basic than ammonia and which react with acid anhydrides to form acylamines comprising reacting these amines with formamide acid sulphate.

5. Method of manufacture of the acyl amines of the phenylene diamines comprising reacting them with amide acid sulphates.

6. Method of manufacture of the di formyl phenylene diamines comprising reacting the corresponding phenylene diamines with formamide acid sulphate.

7. Method of manufacture of the acyl amines of meta phenylene diamine comprising reacting meta phenylene diamine with amide acid sulphates.

8. Method of manufacture of meta di formyl phenylene diamine comprising reacting meta phenylene diamine with formamide acid sulphate.

Signed at Pittsburgh in the county of Allegheny and State of Pennsylvania this 20th day of December, A. D. 1926.

RALF B. TRUSLER.